United States Patent
Pan et al.

(10) Patent No.: US 11,604,936 B2
(45) Date of Patent: Mar. 14, 2023

(54) SPATIO-TEMPORAL GRAPH FOR VIDEO CAPTIONING WITH KNOWLEDGE DISTILLATION

(71) Applicants: TOYOTA RESEARCH INSTITUTE, INC.; THE BOARD OF TRUSTEES OF THE LELAND STANFORD JUNIOR UNIVERSITY, Stanford, CA (US)

(72) Inventors: Boxiao Pan, Palo Alto, CA (US); Haoye Cai, Palo Alto, CA (US); De-An Huang, Stanford, CA (US); Kuan-Hui Lee, San Jose, CA (US); Adrien David Gaidon, San Jose, CA (US); Ehsan Adeli-Mosabbeb, Mountain View, CA (US); Juan Carlos Niebles Duque, Mountain View, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 450 days.

(21) Appl. No.: 16/827,252

(22) Filed: Mar. 23, 2020

(65) Prior Publication Data

US 2021/0295093 A1 Sep. 23, 2021

(51) Int. Cl.
*G06K 9/62* (2022.01)
*G06V 20/56* (2022.01)
*G06V 10/00* (2022.01)

(52) U.S. Cl.
CPC .......... *G06K 9/6224* (2013.01); *G06K 9/629* (2013.01); *G06K 9/6296* (2013.01); *G06V 10/00* (2022.01); *G06V 20/56* (2022.01)

(58) Field of Classification Search
CPC .... G06K 9/6224; G06K 9/629; G06K 9/6296; G06V 10/00; G06V 20/56
See application file for complete search history.

(56) References Cited

U.S. PATENT DOCUMENTS 10,503,978 B2   12/2019  Kadav et al.
11,458,987 B2 * 10/2022  Li ........................ G06N 3/0454
(Continued)

OTHER PUBLICATIONS

Ma, Chih-Yao, et al. "Attend and interact: Higher-order object interactions for video understanding." Proceedings of the IEEE Conference on Computer Vision and Pattern Recognition. 2018. (Year: 2018).*

(Continued)

*Primary Examiner* — Fayyaz Alam
(74) *Attorney, Agent, or Firm* — Seyfarth Shaw LLP

(57) ABSTRACT

A method for scene perception using video captioning based on a spatio-temporal graph model is described. The method includes decomposing the spatio-temporal graph model of a scene in input video into a spatial graph and a temporal graph. The method also includes modeling a two branch framework having an object branch and a scene branch according to the spatial graph and the temporal graph to learn object interactions between the object branch and the scene branch. The method further includes transferring the learned object interactions from the object branch to the scene branch as privileged information. The method also includes captioning the scene by aligning language logits from the object branch and the scene branch according to the learned object interactions.

20 Claims, 7 Drawing Sheets

(56) References Cited

U.S. PATENT DOCUMENTS

| | | | |
|---|---|---|---|
| 11,460,856 B2* | 10/2022 | Chen | G06V 10/82 |
| 2018/0268292 A1 | 9/2018 | Choi et al. | |
| 2021/0103742 A1* | 4/2021 | Adeli-Mosabbeb | H04W 4/40 |

OTHER PUBLICATIONS

Cong, Yuren, et al. "Spatial-temporal transformer for dynamic scene graph generation." Proceedings of the IEEE/CVF International Conference on Computer Vision. 2021. (Year: 2021).*

Xu, Pengfei, et al. "A survey of scene graph: Generation and application." EasyChair Preprint 3385 (2020). (Year: 2020).*

Rosinol, Antoni, et al. "3D dynamic scene graphs: Actionable spatial perception with places, objects, and humans." arXiv preprint arXiv:2002.06289 (2020). (Year: 2020).*

Li, et al., "Spatio-Temporal Graph Routing for Skeleton-Based Action Recognition", The Thirty-Third AAAI Conference on Artificial Intelligence (AAAI-19), Jul. 2019, pp. 8561-8568.

Tang, et al., "Learning Semantics-Preserving Attention and Contextual Interaction for Group Activity Recognition", IEEE Transactions on Image Processing, Oct. 2019, pp. 1-16.

Li, et al., "Spatiotemporal Knowledge Distillation for Efficient Estimation of Aerial Video Saliency", IEEE Transactions on Image Processing, Apr. 10, 2019, pp. 1902-1914, arXiv.org.

* cited by examiner

SPATIO-TEMPORAL GRAPH FOR VIDEO CAPTIONING WITH KNOWLEDGE DISTILLATION

BACKGROUND

Field

Certain aspects of the present disclosure generally relate to machine learning and, more particularly, a spatio-temporal graph for video captioning with knowledge distillation.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a video input based on video captioning describing the scene. Unfortunately, video captioning is a challenging task involving deep understanding of visual scenes.

SUMMARY

A method for scene perception using video captioning based on a spatio-temporal graph model is described. The method includes decomposing the spatio-temporal graph model of a scene in input video into a spatial graph and a temporal graph. The method also includes modeling a two branch framework having an object branch and a scene branch according to the spatial graph and the temporal graph to learn object interactions between the object branch and the scene branch. The method further includes transferring the learned object interactions from the object branch to the scene branch as privileged information. The method also includes captioning the scene by aligning language logits from the object branch and the scene branch according to the learned object interactions.

A non-transitory computer-readable medium having program code recorded thereon for scene perception using video captioning based on a spatio-temporal graph model is described, in which the program code is executed by a processor. The non-transitory computer-readable medium includes program code to decompose the spatio-temporal graph model of a scene in input video into a spatial graph and a temporal graph. The non-transitory computer-readable medium also includes program code to model a two branch framework having an object branch and a scene branch according to the spatial graph and the temporal graph to learn object interactions between the object branch and the scene branch. The non-transitory computer-readable medium further includes program code to transfer the learned object interactions from the object branch to the scene branch as privileged information. The non-transitory computer-readable medium also includes program code to caption the scene by aligning language logits from the object branch and the scene branch according to the learned object interactions.

A system for scene perception using video captioning based on a spatio-temporal graph model is described. The system includes a spatio temporal graph module configured to program code to decompose the spatio-temporal graph model of a scene in input video into a spatial graph and a temporal graph. The system also includes a knowledge distillation module configured to model a two branch framework having an object branch and a scene branch according to the spatial graph and the temporal graph to learn object interactions between the object branch and the scene branch. The knowledge distillation module is also configured transfer the learned object interactions from the object branch to the scene branch as privileged information. The system further includes a video captioning module configured to caption the scene by aligning language logits from the object branch and the scene branch according to the learned object interactions.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
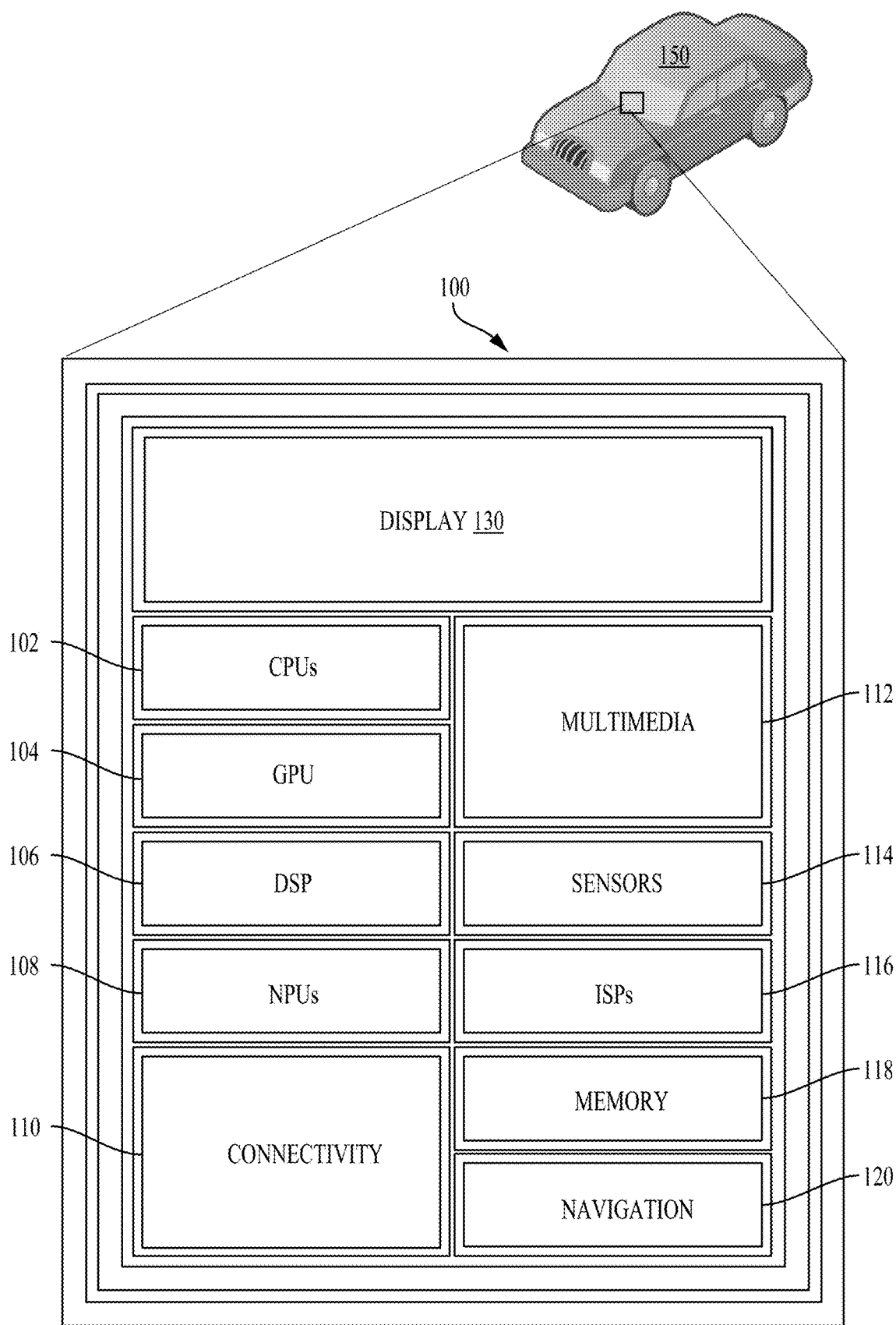
FIG. 1 illustrates an example implementation of designing a system using a system-on-a-chip (SOC) for video captioning with knowledge distillation using a spatio-temporal graph, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Video captioning is a challenging task involving a deep understanding of visual scenes. Conventional methods make predictions using either scene-level or object-level information, but without explicitly modeling object interactions. Consequently, conventional methods are not designed to causally reason about complex events and are sensitive to spurious correlations. Aspects of the present disclosure are directed to a novel spatio-temporal graph model for video captioning that exploits object interactions in space and time. This aspect of the present disclosure provides a model that builds interpretable links and is able to provide explicit visual grounding. To avoid unstable performance caused by a variable number of objects, one aspect of the present disclosure involves an object-aware knowledge distillation mechanism, in which local object information is used to regularize global scene features. This object-aware knowledge distillation mechanism yields competitive performance with interpretable predictions.

Aspects of the present disclosure are directed to a method for performing video captioning by exploiting object interactions using a spatio-temporal graph model. The method includes building one or more interpretable prediction links to provide explicit visual grounding for the video. The method also includes decomposing the spatio-temporal graph model into a spatial graph and a temporal graph. The spatial graph may be used to capture interactions among spatially related objects of the video. For example, video information is incorporated in the spatial graph by connecting the objects using their normalized intersection over union (IoU) value for measuring the spatial connectivity between the objects. The temporal graph may be used to connect semantically similar objects in each adjacent frame pair of the video by computing their pair wise cosine feature similarity. The temporal edges are calculated between an adjacent frame pair of the video for avoiding noisy information in the model. In addition, a graph convolution network is used to update the node features and all spatial and temporal graphs for a video are merged into a single spatio-temporal graph model.

In aspects of the present disclosure, the method further includes designing a two branch framework (e.g., object and scene) using an objective-aware knowledge distillation mechanism to avoid unstable performance. For example, the object branch may capture the space-time object interaction information via the spatio-temporal graph model, while the scene branch provides additional global context missing from the local object features. The object-level information is distilled into the scene feature representation by applying soft regularization on language logits (e.g., intermediate language values) from the two branches. In addition, the local object information is used for regularizing global scene noise features existing in spatio-temporal graph models. Beneficially, the present disclosure provides an object-aware knowledge distillation mechanism that leverages a spatio-temporal graph network to perform video captioning by exploiting object interactions.

FIG. 1 illustrates an example implementation of the aforementioned system and method for video captioning with knowledge distillation using a spatio-temporal graph using a system-on-a-chip (SOC) 100 of an ego vehicle 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for video captioning with knowledge distillation using a spatio-temporal graph of an image captured by the sensor processor 114. The instructions loaded into a processor (e.g., CPU 102) may also include code for planning and control (e.g., intention prediction of the ego vehicle) in response to detecting a cyclist near the ego vehicle based on an image captured by the sensor processor 114.

Figure 2:
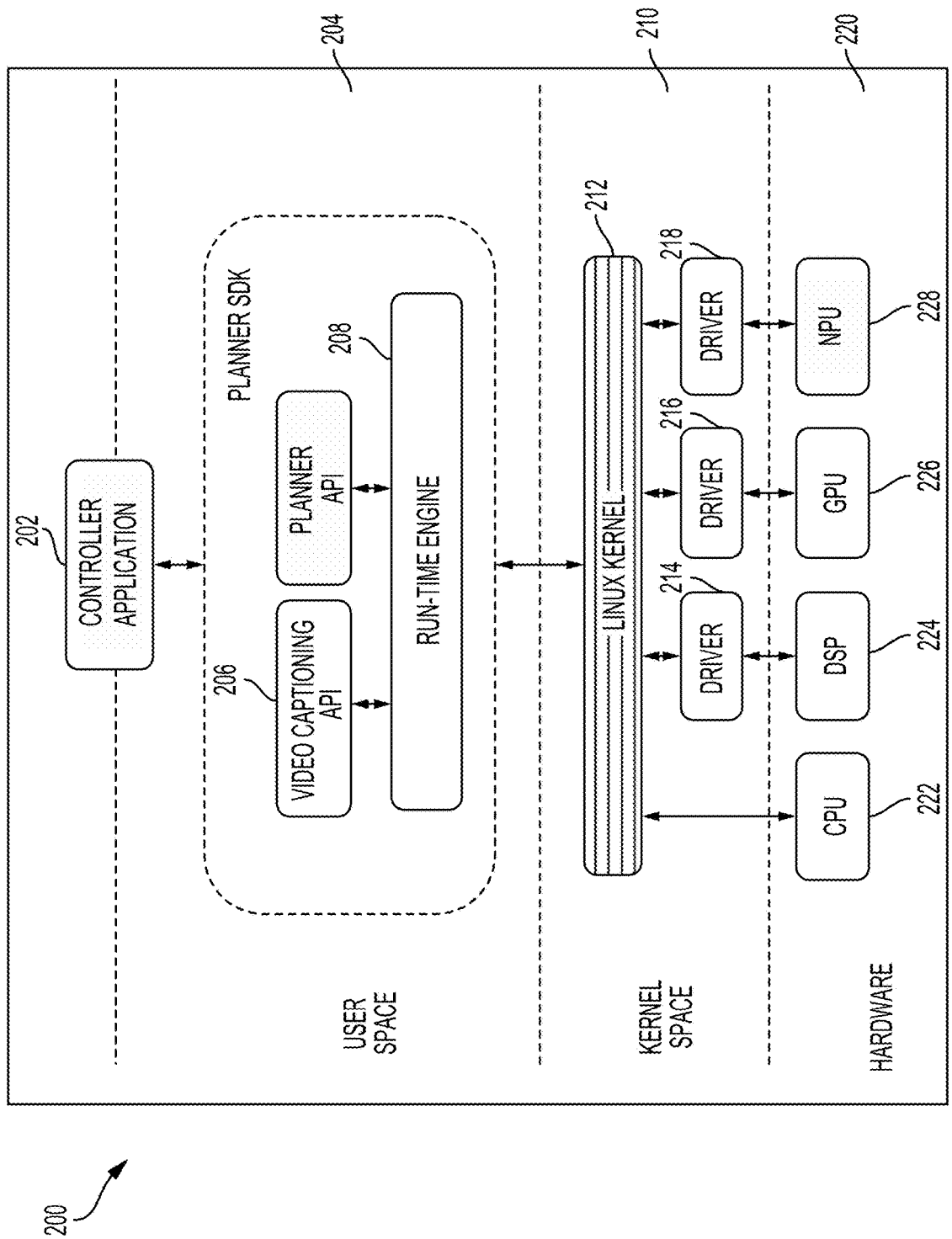
FIG. 2 is a block diagram illustrating a software architecture that may modularize functions for video captioning with knowledge distillation using a spatio-temporal graph, according to aspects of the present disclosure.

FIG. 2 is a block diagram illustrating a software architecture 200 that may modularize functions for planning and control of an ego vehicle using video captioning with knowledge distillation based on a spatio-temporal graph model, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, analyze a scene in a video captured by a monocular camera of an ego vehicle based on video captioning. In aspects of the present disclosure, captioning of the video is improved by using a spatio-temporal graph and knowledge distillation to aid in understanding the scene. The controller application 202 may make a request to compile program code associated with a library defined in a video captioning application programming interface (API) 206 to analyze a scene in a video captured by the monocular camera of the ego vehicle by analyzing the video captioning of the scene.

A run-time engine 208, which may be compiled code of a runtime framework, may be further accessible to the controller application 202. The controller application 202 may cause the run-time engine 208, for example, to perform monocular (single-camera) 3D detection. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
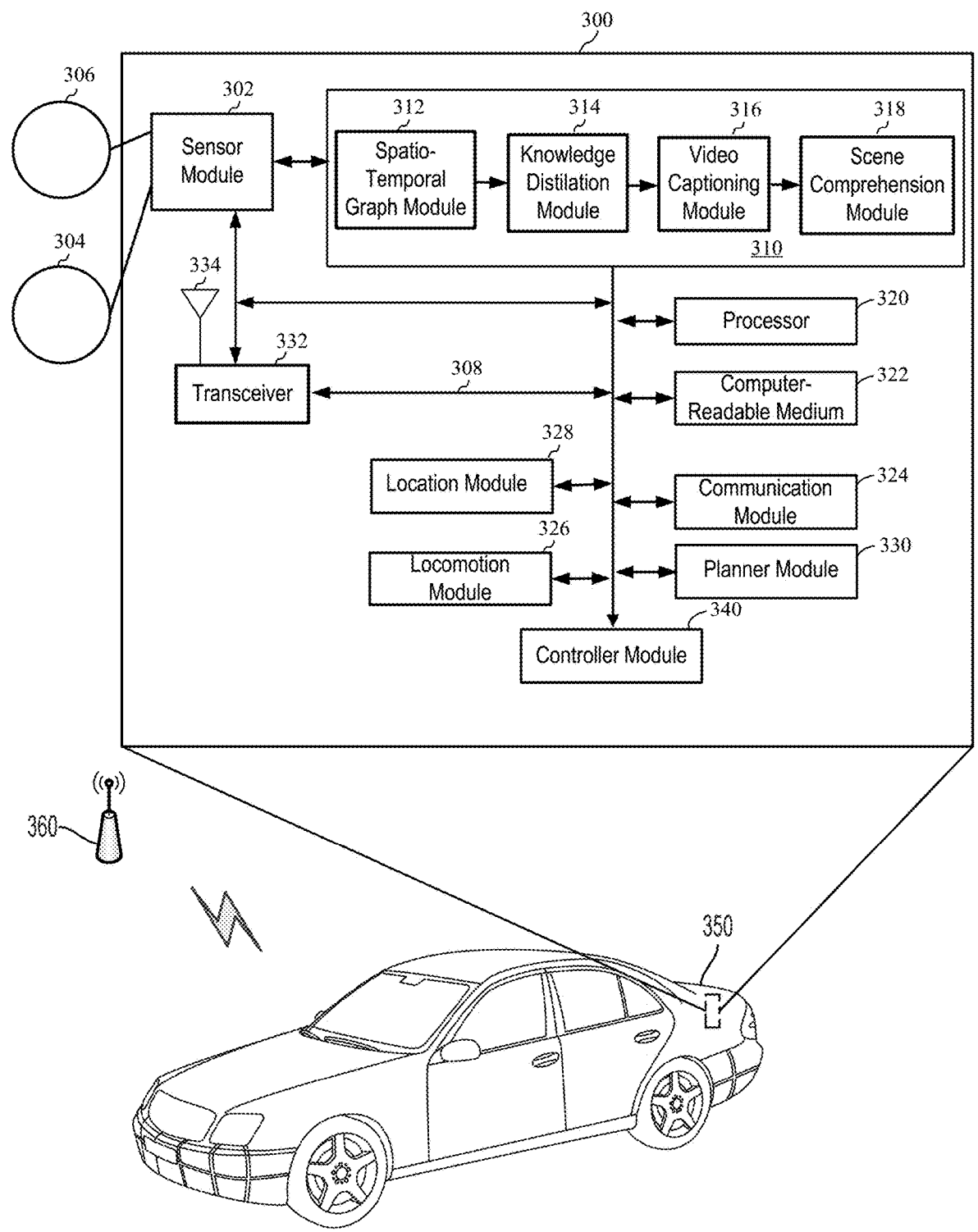
FIG. 3 is a diagram illustrating an example of a hardware implementation for a video captioning system with knowledge distillation using a spatio-temporal graph, according to aspects of the present disclosure.

FIG. 3 is a diagram illustrating an example of a hardware implementation for a video captioning system 300 with knowledge distillation using a spatio-temporal graph, according to aspects of the present disclosure. The video captioning system 300 may be configured for understanding a scene to enable planning and controlling an ego vehicle in response to an image from video captured through a camera during operation of a car 350. The video captioning system 300 may be a component of a vehicle, a robotic device, or other device. For example, as shown in FIG. 3, the video captioning system 300 is a component of the car 350. Aspects of the present disclosure are not limited to the video captioning system 300 being a component of the car 350, as other devices, such as a bus, motorcycle, or other like vehicle, are also contemplated for using the video captioning system 300. The car 350 may be autonomous or semi-autonomous.

The video captioning system 300 may be implemented with an interconnected architecture, represented generally by an interconnect 308. The interconnect 308 may include any number of point-to-point interconnects, buses, and/or bridges depending on the specific application of the video captioning system 300 and the overall design constraints of the car 350. The interconnect 308 links together various circuits, including one or more processors and/or hardware modules, represented by a sensor module 302, an ego perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The video captioning system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit captioned video and/or planned actions from the ego perception module 310 to a server (not shown).

The video captioning system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the video captioning system 300 to perform the various functions described for ego vehicle perception of scenes in video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

Understanding a scene from a video input based on video captioning describing the scene is an important perception task in the area of autonomous driving, such as the car 350. Conventional methods make predictions using either scene-level or object-level information, but without explicitly modeling object interactions. Consequently, conventional methods are not designed to causally reason about complex events and are sensitive to spurious correlations. Aspects of the present disclosure are directed to a spatio-temporal graph model for video captioning that exploits object interactions in space and time. This aspect of the present disclosure provides a model that builds interpretable links and is able to provide explicit visual grounding. To avoid unstable performance caused by a variable number of objects in a scene, one aspect of the present disclosure involves an object-aware knowledge distillation mechanism, in which local object information is used to regularize global scene features. This object-aware knowledge distillation mechanism yields competitive performance with interpretable predictions.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the video captioning system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MIMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The video captioning system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform video captioning using knowledge distillation based on a spatio-temporal graph model from images captured by the first sensor 304 or the second sensor 306 of the car 350.

As shown in FIG. 3, the ego perception module 310 includes a spatio-temporal graph module 312, a knowledge distillation module 314, a video captioning module 316, and a scene comprehension module 318 (e.g., based on video captions). The spatio-temporal graph module 312, the knowledge distillation module 314, the video captioning module 316, and the scene comprehension module 318 may be components of a same or different artificial neural network, such as a deep neural network (DNN). A spatio-temporal graph model of the spatio-temporal graph module 312 is not limited to a deep neural network. In operation, the ego perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

The ego perception module 310 is configured to understand a scene from a video input (e.g., the sensor module) based on video captioning describing the scene as a perception task during autonomous driving of the car 350. Aspects of the present disclosure are directed to a spatio-temporal graph model for video captioning that exploits object interactions in space and time as well as transformations of objects. This aspect of the present disclosure provides a model that builds interpretable links and is able to provide explicit visual grounding (e.g., locate relevant object/region in an image using video captioning). Variable numbers of objects in a scene, however, may lead to unstable performance. As a result, one aspect of the present disclosure provides an object-aware knowledge distillation mechanism, in which local object information is used to conform global scene features.

In this aspect of the present disclosure, the spatio-temporal graph module 312 enables improved video captioning by exploiting the spatio-temporal interactions and transformations of objects. The spatio-temporal graph module 312 represents input video of a scene as a spatio-temporal graph, in which nodes represent objects and edges represent correlations. To build interpretable and meaningful connections within the spatio-temporal graph, the knowledge distillation module 314 provides adjacency matrices configured to explicitly incorporate prior knowledge on spatial layout as well as temporal transformation. Subsequently, graph convolution is performed to update the spatio-temporal graph representation. This updated representation is then injected into another scene branch, where we directly model the global frame sequences, as privileged object information via the proposed object-aware knowledge distillation mechanism. Afterwards, language decoding is performed through the video captioning module to obtain a final text description of the scene, for example, as shown in FIG. 4.

Figure 4:
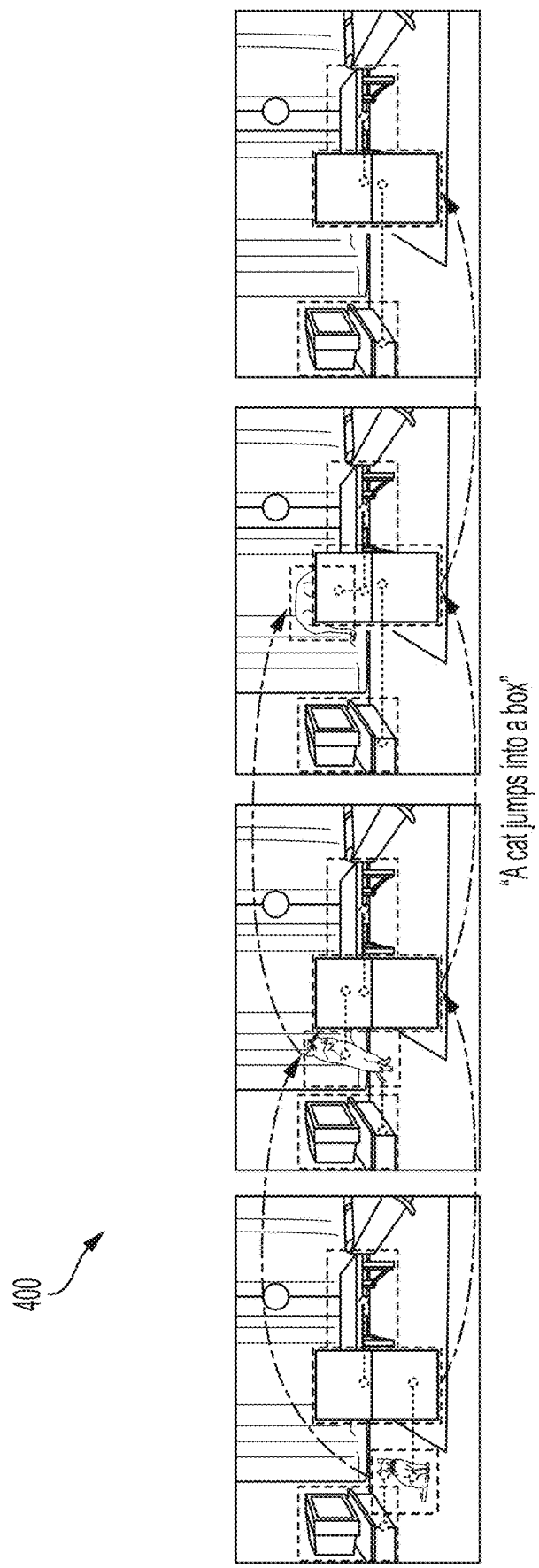
FIG. 4 depicts improved video captioning of a scene according to aspects of the present disclosure.

FIG. 4 depicts improved video captioning of a scene according to aspects of the present disclosure. Consider the scene 400 shown in FIG. 4. To understand the video caption: "A cat jumps into a box," a "cat" and "box," are first identified, and then the transformation of "cat jumps into the box" is captured. That is, scenes are complicated, not only because of the diverse set of entities involved, but also the complex interactions among them. To understand the scene 400, it is important to ignore the "television" and "bed," because they mostly serve as distractors from comprehending what is happening in the scene 400.

Aspects of the present disclosure, explicitly model spatio-temporal object relationships for video captioning by focusing on cross-object interaction and object transformation over time. Video captioning is improved by capturing higher-level relationships among the high-level semantic entities. In particular, this video captioning approach models the correlations among high-level semantic entities that capture their interactions. Capturing the interactions of the high-level semantic entities improves scene understanding for generating text descriptions and captioning video input. The improved video captioning provides direct correlations among the high-level semantic entities and, hence, is not sensitive to spurious correlations.

Aspects of the present disclosure introduce a two-branch network structure, where an object branch captures object interactions as privileged information, and then injects the information into a scene branch by performing knowledge distillation between their language logits. This aspect of the present disclosure applies soft regularization on language logits, which makes the learned features more robust, and thus may be referred to as "object-aware knowledge distillation." During testing, the scene branch is used, which leverages the distilled features with already embedded object information. This approach beneficially saves the cost of running object detection at test time, for example, as shown FIG. 5.

Figure 5:
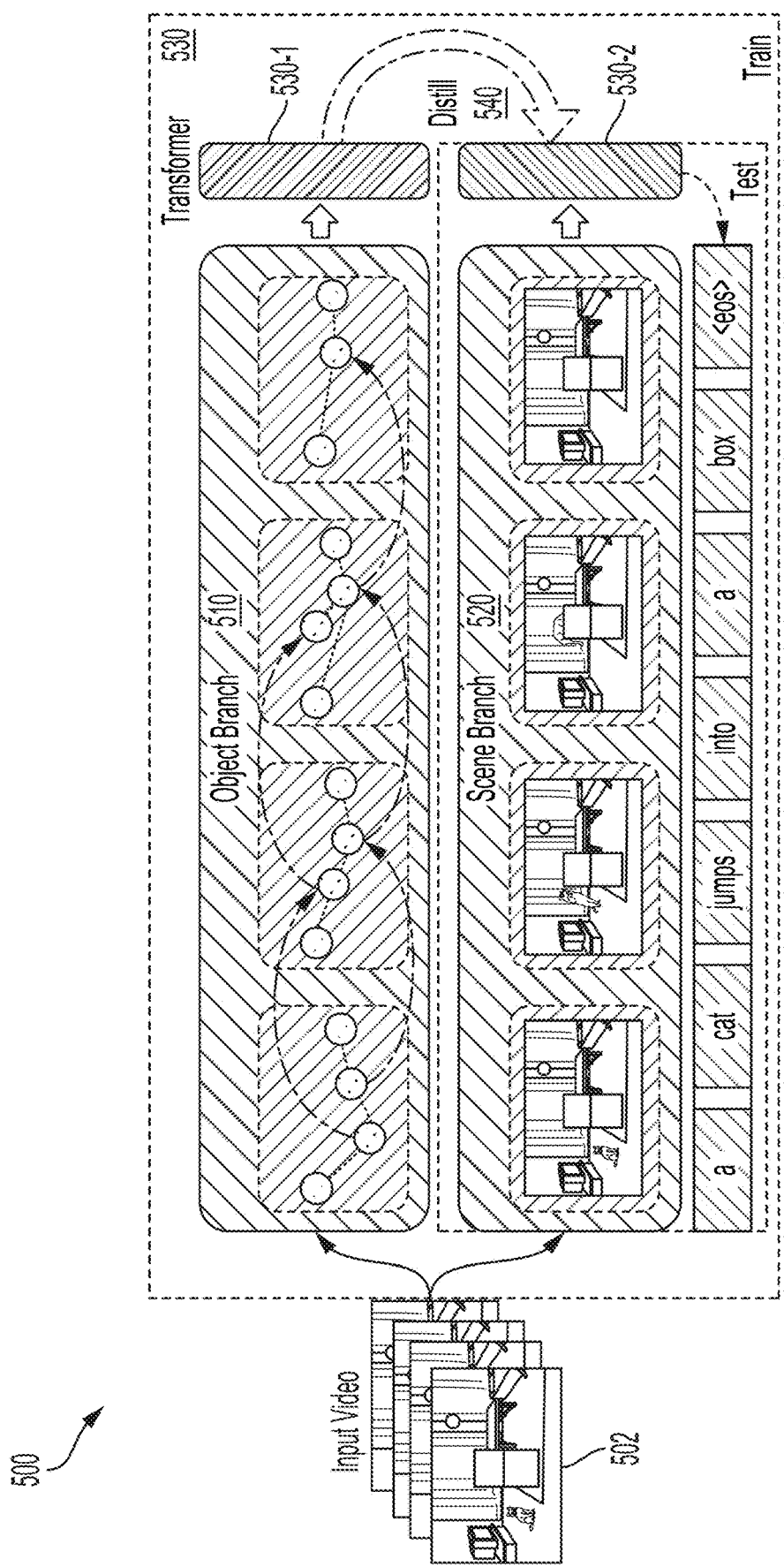
FIG. 5 illustrates an overview of a two-branch video captioning framework, according to aspects of the present disclosure.

FIG. 5 illustrates an overview of a two-branch video captioning framework 500, according to aspects of the present disclosure. During training, an object branch 510 of the two-branch video captioning framework 500 captures space-time object interaction information. In one aspect of the present disclosure, the object branch 510 captures space-time object interaction information via the proposed spatio-temporal graph model, while a scene branch 520 provides global context that is absent from the object branch 510. During the training process, given an input video 502 that depicts a dynamic scene, one aspect of the disclosure condenses the scene into a representation that fully captures a spatio-temporal graph network, which serves as the object branch 510.

Once the space-time object interaction information is captured, this interaction information is distilled into another branch of the scene branch 520 using, for example, a distillation module 540 (e.g., an object-aware knowledge distillation module). In one aspect of the present disclosure, the distillation module 540 is configured to distill object-level information into a scene feature representation by aligning language logits between the object branch 510 and the scene branch 520. That is, language decoding is performed through a transformer network 530 to obtain a final text description 550. Note that for clarity, an arrow from the transformer network 530 (e.g., an object branch transformer) to the output sentence (e.g., final text description 550) is omitted, but it is also trained by language loss. During testing, the scene branch 520 is kept for sentence generation.

1. Method

An overview of the two-branch video captioning framework 500 is illustrated in FIG. 5. FIG. 5 shows a system and method to perform video captioning by exploiting the spatio-temporal interactions and transformations of objects. Specifically, the input video 502 is first represented as a spatio-temporal graph, where nodes represent objects and edges measure correlations among the objects as part of the object branch 510. In this aspect of the present disclosure, adjacency matrices are designed to explicitly incorporate prior knowledge on spatial layout as well as temporal transformation to build interpretable and meaningful connections. Subsequently, graph convolution is performed to update the spatio-temporal graph representations. This updated representation is then injected into the scene branch 520 by a distillation module 540. In this configuration, the global frame sequences are directly modeled as privileged object information via the proposed object-aware knowledge distillation mechanism (e.g., the distillation module 540). Afterwards, language decoding is performed through a transformer network 530 to obtain the final text description 550.

1.1 Feature Representation

Given a sequence of RGB frames $\{x_1, x_2, \ldots x_T\}$, two types of features are extracted (e.g., scene features and object features, as shown by the object branch 510 and the scene branch 520.

Scene Features. A procedure is performed in which a sequence of 2D frame features $F_{2D}=\{f_1, f_2, \ldots, f_T\}$ is first extracted (e.g., using ResNet-101), with each $f_t \in \mathbb{R}^{d_{2D}}$. A set of 3D clip features $F_{3D}=\{v_1, v_2, \ldots, v_L\}$ are also extracted via an I3D network, with $v_l \in \mathbb{R}^{d_{2D}}$.

Object Features. A convolutional neural network (CNN) is run (e.g., Faster R-CNN) on each frame to generate a set of object features $F_o=\{o_1^1, o_1^2, \ldots, o_t^j, \ldots, o_T^{N_T}\}$, where Nt denotes the number of objects in frame t and j is the object index within each frame. Each $o_t^j$ has the same dimension $d_{2D}$ as $F_{2D}$.

1.2 Spatio-Temporal Graph

Objects have radically different behaviors across the space and time domains. On the one hand, different objects interact with each other spatially. While on the other hand, the same objects transform (e.g., shape, location, pose, etc.) temporally. In order to capture these two types of object correlations, a graph is decomposed into two components: a spatial graph and a temporal graph. A unique undirected spatial graph is instantiated for each frame, whose adjacency matrix is denoted by $G_t^{space}$ for time step t. For a temporal graph, in order to not overwhelm the model with noisy information, temporal edges are calculated between an adjacent frame pair instead of in a fully-connected manner. Note that the temporal graph is still connected across all time steps in this way. The resultant temporal graph going from t to t+1 is represented as $G_t^{time}$, which is a directed graph following along the direction of time flow.

Spatial Graph. The spatial graph is configured to capture interactions among spatially related objects. Take the scene 400 shown in FIG. 4, for example. An object detector, identifies a "cat" as well as a "box" in the scene 400, but how can the object detector deduce a clue on whether the cat is interacting with the box? The crux of solving this problem lies in the relative spatial location of the objects. Based on a key observation that objects which are close to each other are more likely to be correlated. In aspects of the present disclosure, this correlation information is explicitly incorporated into the spatial graph by connecting objects using their normalized intersection over union (IoU) value:

$$G_{tij}^{space} = \frac{\exp\sigma_{tij}}{\sum_{j=1}^{Nt} \exp\sigma_{tij}} \quad (1)$$

where $G_{tij}^{space}$ is the (i,j)-th element of $G_t^{space} \in \mathbb{R}^{N_t \times N_t}$, which measures the spatial connectivity between the ith and jth objects at time step t. In addition, a Softmax function may be adopted as the normalization, in which $\Sigma_{tij}$ denotes the IoU between the two objects.

Temporal Graph. While the spatial graph has the capability of capturing interactions among objects at the same time step, it is unable to model the object transformations over time. In the example in FIG. 4, there is no way to tell what the cat is doing with the box within any single frame. To this end, aspects of the present disclosure connect semantically similar objects in every adjacent frame pair by computing their pair-wise cosine feature similarity:

$$G_{tij}^{time} = \frac{\exp\cos(o_t^i, o_{t+1}^j)}{\sum_{j=1}^{Nt+1} \exp\cos(o_t^i, o_{t+1}^j)}, \quad (2)$$

where $G_{tij}^{time}$ denotes the (i,j)-th element of $G_t^{time} \in \mathbb{R}^{Nt \times Nt+1}$, and cos $(o^i, o^j)$ measures the cosine similarity between the two vectors.

Convolutions on the Spatio-Temporal Graph. After the topological graph structure is established following the procedure above, the next step is to update the node features based on this graph structure. This update may be performed using a graph convolutional network (GCN). To extend the original GCN to the space-time domain, all spatial and temporal graphs for a video are first merged into a single spatio-temporal graph $G^{st}$ as follows:

$$G^{st} = \begin{bmatrix} G_1^{space} & G_1^{time} & 0 & \ldots & 0 \\ 0 & G_2^{space} & G_2^{time} & \ldots & 0 \\ 0 & 0 & G_3^{space} & \ldots & 0 \\ \vdots & \vdots & \vdots & \ddots & \vdots \\ 0 & 0 & 0 & \ldots & G_2^{space} \end{bmatrix} \in \mathbb{R}^{N \times N} \quad (3)$$

where each $G_t^{space}$ and $G_t^{time}$ are the spatial and temporal adjacency matrices defined above. Note that the 0s in Eq. (3) are zero-valued matrices, whose shapes are determined correspondingly by neighboring space and time matrices. N is the total number of objects in the video, i.e., $$N = \sum_{t=1}^{T} N_t.$$

At this point, the graph can be updated via the standard graph convolution, which is formally defined as follows:

$$H^{(l+1)} = ReLU\left(H^{(l)} + \Lambda^{-\frac{1}{2}} G^{st} \Lambda^{-\frac{1}{2}} H^{(l)} W^{(l)}\right), \quad (4)$$

where $W(l) \in \mathbb{R}^{dmodel \times dmodel}$ is the weight matrix of layer l. $\Lambda$ is the diagonal degree matrix with $\Lambda_{ii} = \Sigma_j G_{ij}^{st}$. Next, residual connections are added using an activation function (e.g., a rectified linear unit (ReLU) function). The GCN is implemented by performing 1×1×1 convolution on the input tensor $H^{(l)}$ followed by multiplying the resulting tensor with $$\Lambda^{-\frac{1}{2}} G^{st} \Lambda^{-\frac{1}{2}} \cdot H^{(l)} \in \mathbb{R}^{N \times dmodel}$$

is the activation from layer l. Particularly, $H^{(0)}$ are the stacked object features:

$$H^{(0)} = \text{stack}(F_o) W_o \in \mathbb{R}^{N \times dmodel}, \quad (5)$$

where stack( ) stacks all object features in $F_o$ along with the first dimension, and $W_o \in \mathbb{R}^{d2D \times dmodel}$ is the transformation matrix.

1.3 Scene Branch

In aspects of the present disclosure, the frame sequence is directly modeled through a separate scene branch (e.g., scene branch 520). This scene branch provides additional global context information that may be missing from the local object features, and is especially important when a video has no or very few detected objects. To highlight the effect of the proposed spatio-temporal graph and isolate the performance from the progress in scene modeling, this scene branch is kept as simple as possible. For example, for every sixteen (16) consecutive non-overlapping frames, one 3D feature is extracted. Next, the 3D feature is replicated sixteen (16) times along temporal dimension (e.g., each 3D feature spans and provides the context across 16 time steps), and the T slices corresponding to the 2D features are sampled. Subsequently, the 2D and 3D features are projected to have the same number of features $d_{model}$, then concatenated together and projected again to $d_{model}$:

$$F_s = [F_{2D} W_{2D}; F'_{3D} W_{3D}] W_{fuse} \in \mathbb{R}^{T \times dmodel}, \quad (6)$$

where $W_{2D} \in \mathbb{R}^{T \times dmodel}$, $W_{3D} \in \mathbb{R}^{d3D \times dmodel}$ and $W_{fuse} \in \mathbb{R}^{2dmodel \times dmodel}$ are transformation matrices. $F'_{3D}$ represents the 3D features after the process stated above. [;] denotes concatenation along channel dimension.

1.4 Language Decoder

During training, the scene features $F_s$ and the object features $F_o$ are both passed to perform language decoding. At test time, only the scene feature $F_s$ is used to generate the predicted sentence. Aspects of the present disclosure focus on the visual encoding part, and keep the language decoding as simple as possible by directly adopting a two-view transformer architecture. This aspect of the present disclosure uses two separate transformers (e.g., an object branch transformer 530-1 and a scene branch transformer 530-2) for both branches and trains them simultaneously. For example, a standard training procedure may be adopted to minimize language cross-entropy losses $L_{o\_lang}$ and $L_{s\_lang}$ for the object branch 510 and the scene branch 520, respectively.

1.5 Object-Aware Knowledge Distillation

The common problem with merging (e.g., concatenation, pooling, etc.) two branches or adding scene features as a separate graph node is that videos (and even frames in the same video) contain a variable number of objects. Unfortunately, the variable number of objects makes the learned features very noisy. This is because by either merging or adding an extra node, hard constraints are imposing on the features, which is too strong for aligning features that come from two intrinsically different spaces. Conversely, by applying soft regularization on language logits (e.g., probability distributions), aspects of the present disclosure ensure a robust feature learning process and leverage the object information at the same time. According to aspects of the present disclosure, the mechanism for aligning language logits can be thought as doing late fusion of the two branches, rather than early fusion, as performed by direct feature merging. For example, the KL divergence is minimized between word probability distribution from the two branches. Let $P_o(x)$ be the probability distribution (pre-Softmax logits) across the vocabulary V from object branch and $P_s(x)$ be the distribution from the scene branch. A distillation loss is minimized by:

$$L_{distill} = -\sum_{x \in V} P_s(x) \log\left(\frac{P_o(x)}{P_s(x)}\right) \quad (7)$$

In this example, knowledge distillation is performed by aligning the features directly (e.g., by minimizing their L2 distance), which essentially places hard constraints on the features.

1.6 Training

We freeze the scene and object feature extractors and only train the remaining part of the model. In this example, the overall loss function consists of three parts:

$$L = L_{o\_lang} + \lambda_{st} L_{s\_lang} + \lambda_d L_{distill}, \quad (8)$$

where $\lambda_{st}$ and $\lambda_d$ are trade-off hyper-parameters.

Figure 6:
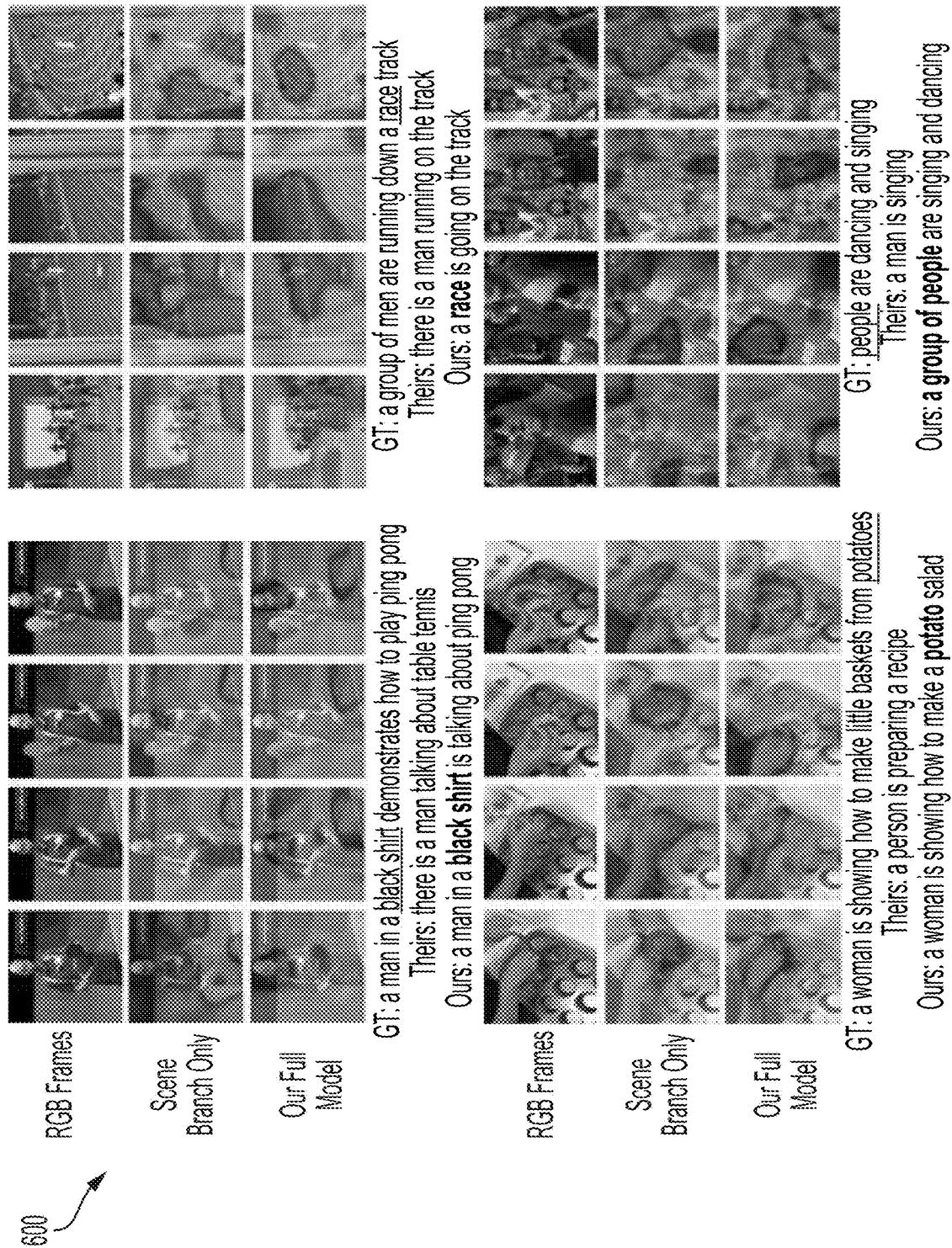
FIG. 6 illustrates qualitative results based on four different videos, according to aspects of the present disclosure.

FIG. 6 illustrates qualitative results 600 based on four different videos, according to aspects of the present disclosure. For each video, the first row shows its RGB frames, while the second and third rows are the saliency maps from our "Scene Branch Only" and "Our Full Model" variants, respectively. Specifically, red color indicates high attention scores, while blue means the opposite. In addition, the ground-truth (GT) is present as well as predicted sentences from conventional techniques relative to aspects of the present disclosure.

Figure 7:
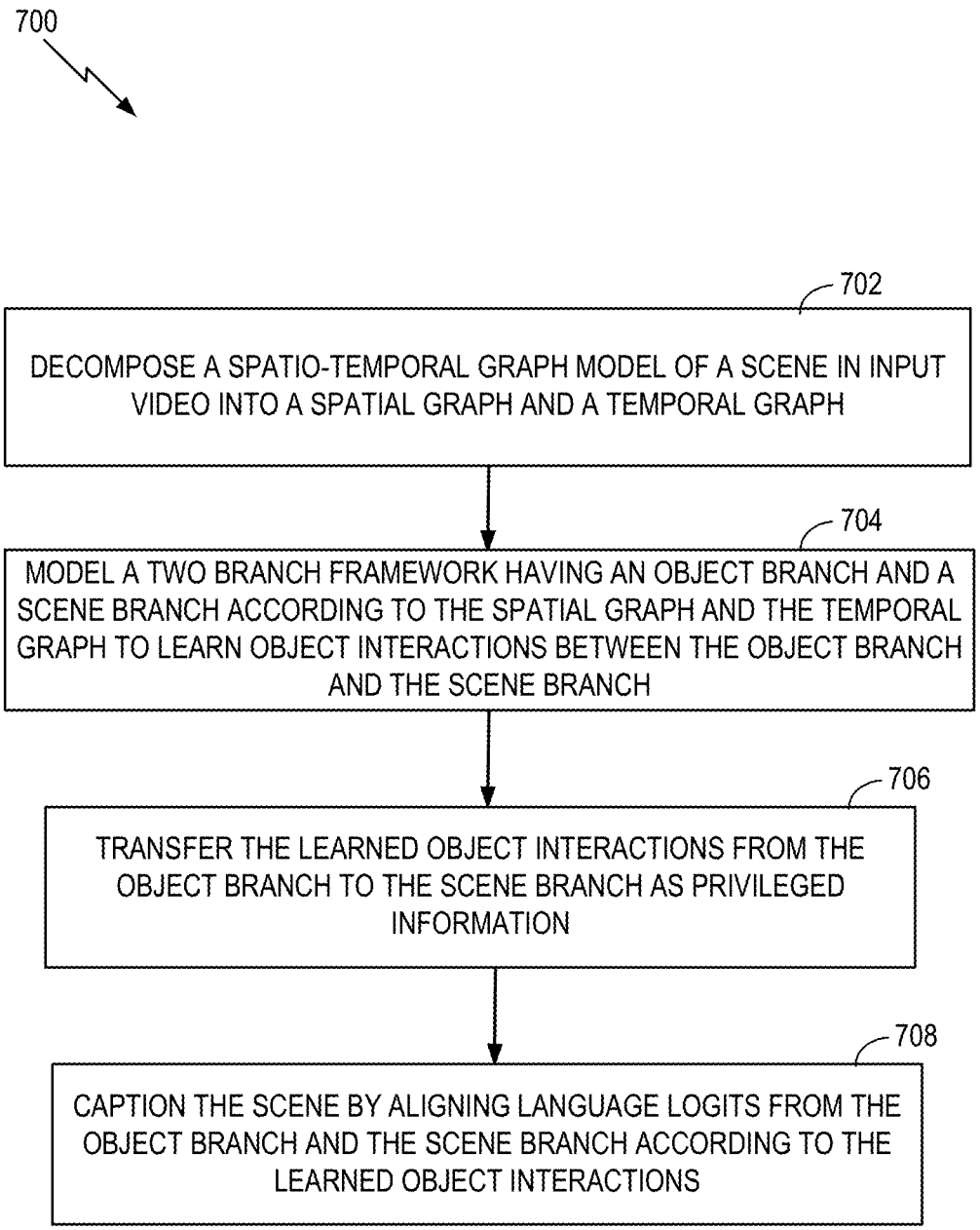
FIG. 7 is a flowchart illustrating a method for scene perception using video captioning based on a spatio-temporal graph model, according to aspects of the present disclosure.

FIG. 7 is a flowchart illustrating a method for scene perception using video captioning based on a spatio-temporal graph model, according to aspects of the present disclosure. The method 700 begins at block 702, in which a spatio-temporal graph model of a scene in input video is deposed into a spatial graph and a temporal graph. For example, as shown in FIG. 5, For example, the spatial graph is used to capture interactions among spatially related objects of the input video. The video information may be incorporated in the spatial graph by connecting the objects using their normalized intersection over union (IoU) value for measuring the spatial connectivity between the objects. In addition, the temporal graph is used to connect all semantically similar objects in every adjacent frame pair of the input video by computing their pair wise cosine feature similarity. In this example, the temporal edges are calculated between an adjacent frame pair of the input video for avoiding noisy information in the model. In this aspect of the present disclosure, a graph convolutional network is used to update the node features and all spatial and temporal graphs for the input video are merged into a single spatio-temporal graph model.

At block 704, a two branch framework having an object branch and a scene branch is modeled according to the spatial graph and the temporal graph to learn object interactions between the object branch and the scene branch. For example, as shown in FIG. 5, the object branch 510 captures the space-time object interaction information via the spatio-temporal graph model, and the scene branch 520 provides additional global context missing from the local object features. At block 706, the learned object interactions are transferred from the object branch to the scene branch as privileged information. At block 708, the scene is captioned by aligning language logits from the object branch and the scene branch according to the learned object interactions. For example, as shown in FIG. 5, the object-level information is distilled into the scene feature representation by applying soft regularization on language logits from the object branch 510 and the scene branch 520. In addition, the local object information may be used to regularize global scene noise features existing in the spatio-temporal graph models.

In some aspects of the present disclosure, the method 700 may be performed by the SOC 100 (FIG. 1) or the software architecture 200 (FIG. 2) of the ego vehicle 150 (FIG. 1). That is, each of the elements of method 700 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints.

The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for scene perception using video captioning based on a spatio-temporal graph model, comprising:
    decomposing the spatio-temporal graph model of a scene in input video into a spatial graph and a temporal graph;
    modeling a two branch framework having an object branch and a scene branch according to the spatial graph and the temporal graph to learn object interactions between the object branch and the scene branch;
    transferring the learned object interactions from the object branch to the scene branch as privileged information; and
    captioning the scene by aligning language logits from the object branch and the scene branch according to the learned object interactions.

2. The method of claim 1, in which captioning comprises decoding the aligned language logits between the object branch and the scene branch to form a caption for the scene.

3. The method of claim 2, in which language decoding is performed through a transformer network to obtain a final text description as the caption for the scene.

4. The method of claim 1, in which transferring further comprises encoding a relationship between objects in the object branch and the scene in the scene branch.

5. The method of claim 1, further comprising planning a trajectory of an ego vehicle according to perception of the scene from the video captured by the ego vehicle.

6. The method of claim 1, further comprising:
    modeling the object branch in a first neural network; and
    modeling the scene branch in a second neural network.

7. The method of claim 1, further comprising classifying the input video according to the captioning of the scene.

8. The method of claim 1, in which the spatial graph is used to capture interactions among spatially related objects of the video.

9. The method of claim 1, further comprising incorporating video information in the spatial graph by connecting objects using their normalized intersection over union (IoU) value for measuring a spatial connectivity between the objects.

10. The method of claim 1, in which the object branch captures space-time object interaction information via the spatio-temporal graph model, and the scene branch provides additional global context missing from local object features.

11. A non-transitory computer-readable medium having program code recorded thereon for scene perception using video captioning based on a spatio-temporal graph model, the program code being executed by a processor and comprising:
    program code to decompose the spatio-temporal graph model of a scene in input video into a spatial graph and a temporal graph;
    program code to model a two branch framework having an object branch and a scene branch according to the spatial graph and the temporal graph to learn object interactions between the object branch and the scene branch;
    program code to transfer the learned object interactions from the object branch to the scene branch as privileged information; and
    program code to caption the scene by aligning language logits from the object branch and the scene branch according to the learned object interactions.

12. The non-transitory computer-readable medium of claim 11, in which the program code to caption comprises program code to decode the aligned language logits between the object branch and the scene branch to form a caption for the scene, in which language decoding is performed through a transformer network to obtain a final text description as the caption for the scene.

13. The non-transitory computer-readable medium of claim 11, in which the program code to transfer further comprises program code to encode a relationship between objects in the object branch and the scene in the scene branch.

14. The non-transitory computer-readable medium of claim 11, further comprising program code to plan a trajectory of an ego vehicle according to perception of the scene from video captions of the video captured by the ego vehicle.

15. The non-transitory computer-readable medium of claim 11, further comprising:
    program code to model the object branch in a first neural network; and
    program code to model the scene branch in a second neural network.

16. The non-transitory computer-readable medium of claim 11, further comprising program code to classify the input video according to video captions of the scene.

17. The non-transitory computer-readable medium of claim 11, further comprising program code to incorporate video information in the spatial graph by connecting objects using their normalized intersection over union (IoU) value for measuring a spatial connectivity between the objects, in which the spatial graph is used to capture interactions among spatially related objects of the video.

18. The non-transitory computer-readable medium of claim 11, in which the object branch captures space-time object interaction information via the spatio-temporal graph model, and the scene branch provides additional global context missing from local object features.

19. A system for scene perception using video captioning based on a spatio-temporal graph model, the system comprising:
    a spatio temporal graph module configured to program code to decompose the spatio-temporal graph model of a scene in input video into a spatial graph and a temporal graph;
    a knowledge distillation module configured to model a two branch framework having an object branch and a scene branch according to the spatial graph and the temporal graph to learn object interactions between the object branch and the scene branch and transfer the learned object interactions from the object branch to the scene branch as privileged information; and a video captioning module configured to caption the scene by aligning language logits from the object branch and the scene branch according to the learned object interactions.

20. The system of claim 19, further comprising:

a scene comprehension module configured to comprehend the scene from the video captured by an ego vehicle according to video captioning of the scene; and a planner module configured to plan a trajectory of the ego vehicle according to a comprehension of the scene from the video captured by the ego vehicle based on the scene comprehension module.

\* \* \* \* \*